C. WEITMAN.
Tire Shrinker.

No. 33,767.

Patented Nov. 19, 1861.

Witnesses

Inventor

UNITED STATES PATENT OFFICE.

CHRISTIAN WEITMAN, OF INDEPENDENCE, IOWA, ASSIGNOR TO HIMSELF, H. W. GLYNN, AND A. HAGEMAN, OF SAME PLACE.

IMPROVED DEVICE FOR SHRINKING TIRES.

Specification forming part of Letters Patent No. 33,767, dated November 19, 1861.

*To all whom it may concern:*

Be it known that I, CHRISTIAN WEITMAN, of Independence, in the county of Buchanan and State of Iowa, have invented a new and useful Improvement in Shrinking Tires on the Wheels of Vehicles; and I do hereby declare that the following is a full, clear, and exact description of the same, reference being had to the annexed drawings, making a part of this specification, in which—

Figure 1:
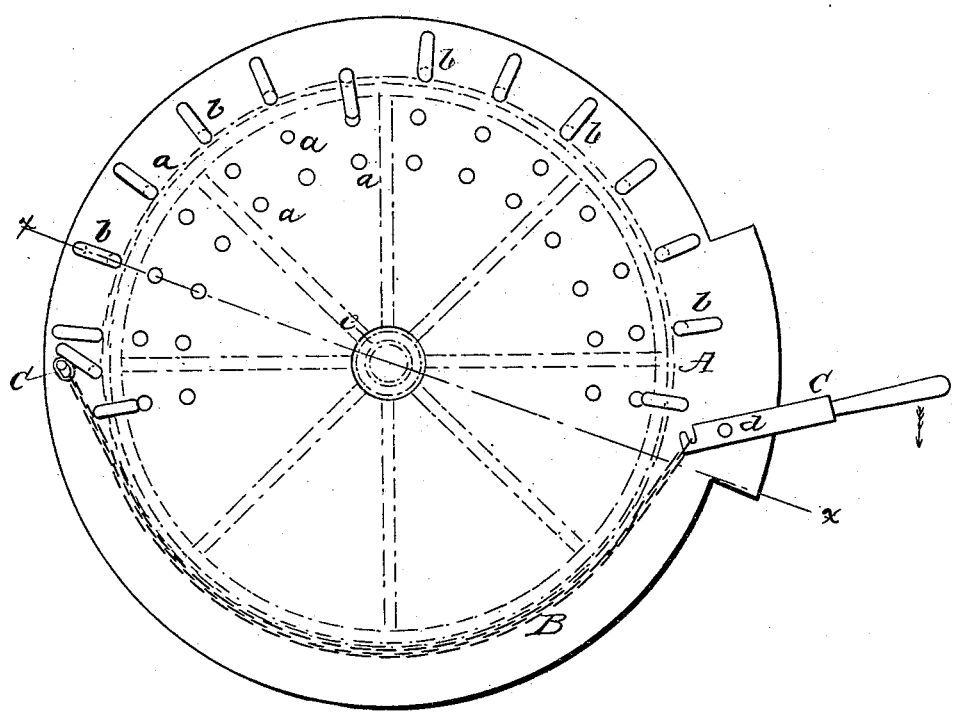
Figure 2:
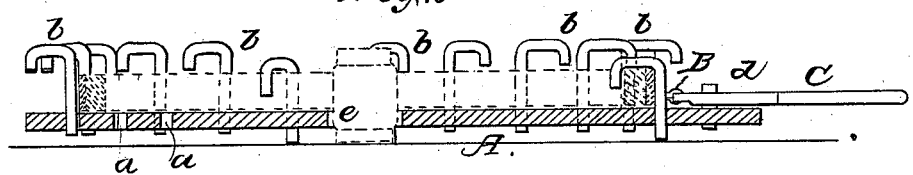

Figure 1 is a front or face view of my invention. Fig. 2 is a section of same, taken in the line $x\ x$, Fig. 1.

Similar letters of reference indicate corresponding parts in the two figures.

The object of this invention is to obtain a simple device whereby the tires of wheels may be shrunk so as to fit snugly and tightly on the wheels without the necessity of cutting and rewelding them, the invention admitting of ordinary persons not mechanics—such as farmers, teamsters, &c.—setting the tires of their own vehicles when necessary without the aid of a mechanic.

The invention consists in the employment or use of a metal plate or wooden block covered with metal and provided with a series of holes made in semicircular concentric rows and provided with pins, in combination with a chain and lever, all being arranged substantially as hereinafter fully shown and described.

To enable those skilled in the art to fully understand and construct my invention, I will proceed to describe it.

A represents a circular plate, which may be of cast-iron, or wood may be employed, covered with metal. Cast-iron, however, would be the preferable material. The plate A has a series of holes $a$ made in it, said holes being in semicircular concentric rows, as shown clearly in Fig. 1, any proper number of rows being used to suit wheels of different diameters. In one of the rows of holes $a$ there are placed pins $b$, which form a bearing for the tire at one side of it, and B is a chain, one end of which is fitted on a pin $c$ in the plate A near its edge, the opposite end of the chain being attached to a lever C, the fulcrum-pin $d$ of which is also attached to the plate A near its edge and at an opposite point on the plate to the pin $c$. The chain B extends around the part of the tire opposite to the pins $b$, as shown clearly in Fig. 1.

The device is used as follows: The tire to be shrunk is removed from the wheel, properly heated, and then replaced on the wheel, and the latter is placed on the plate A, its hub passing through a central hole $e$ in the plate. The pins $b$ are then adjusted in the proper row of holes $a$, and the chain B also adjusted to the plate, and the lever C is then actuated in the direction indicated by the arrow, Fig. 1. By this arrangement, therefore, it will be seen that the tire will be upset and compressed snugly to the wheel.

I would remark that the pins $b$ are of hook form at their outer ends, so that a requisite number of them may be fitted over the rim of the wheel to keep the latter, with its tire, in proper position while being operated upon.

The chief advantage of this invention is the simplicity of the operation, there being no guess-work required in fitting the tire to the wheel, as the former is shrunk while on the wheel. In all other tire-shrinking devices—that is to say, all with which I am acquainted—the tire is shrunk when detached from its wheel, and hence considerable judgment, obtained only by practice, is necessary in order to shrink the tire, just as much as is necessary in order to have it fit properly. My invention, it will be seen, obviates this difficulty and will enable any one of ordinary ability to set or shrink a tire on a wheel.

Having thus described my invention, what I claim as new, and desire to secure by Letters Patent, is—

The plate A, provided with a series of semicircular concentric holes $a$ and pins $b$, in combination with the chain B and lever C, all arranged substantially as and for the purpose set forth.

CHRISTIAN WEITMAN.

Witnesses:
JAMES JAMISON,
SOLOMON RUFE.